Feb. 27, 1968

G. A. MAHOFF 3,370,870

FLEXIBLE TUBULAR COUPLING

Original Filed March 29, 1965

INVENTOR.
GEORGE A. MAHOFF
BY
Elliott & Pastoriza
ATTORNEYS

United States Patent Office 3,370,870
Patented Feb. 27, 1968

3,370,870
FLEXIBLE TUBULAR COUPLING
George A. Mahoff, Denver, Colo., assignor to Gamah Corporation, a corporation of California
Continuation of application Ser. No. 443,611, Mar. 29, 1965, which is a continuation-in-part of application Ser. No. 68,725, Nov. 14, 1960. This application Aug. 15, 1966, Ser. No. 572,623
5 Claims. (Cl. 285—233)

ABSTRACT OF THE DISCLOSURE

A flexible tube coupling for sealably joining tubular members or a tubular member and another structure having a communicating fluid passage therein to allow for relative axial, rotary and angular misalignment between the members being connected. A tubular end portion is provided with a beaded section, which is sealed over an inner liner having a flanged end portion. A sleeve is coupled to the beaded end portion preferably by a lock ring and sealed thereto by an O-ring.

The present application is a continuation of application Ser. No. 443,611 filed Mar. 29, 1965, and now abandoned, which is a continuation-in-part of application Ser. No. 68,725 and now Patent No. 3,186,739.

This invention relates to couplings or connectors for joining together opposing tubular members or for sealably connecting a tubular member to any type of structure having a fluid passage designed to communicate therewith. The flexible coupling of the present invention is designed for use, for example, in conjunction with aircraft where opposing tubular end portions may be subject not only to relative rotary and axial movement, but also to relative angular movement. An important feature of the present invention, therefore, is to maintain a substantially constant sealing force in the coupling despite the rotary, axial or angular flexure between the tubular members.

Also, the improved coupling of the present invention is adapted to operate satisfactorily over an appreciably wide range of environmental conditions characterized by unusual temperature and pressure characteristics, both in the fluid flowing therethrough and externally.

The coupling, however, of the present invention is constructed so as to include the tubular end portions, as such, as an important part thereof with the result that a much lighter weight construction is achieved. Other features of the coupling are directed towards improvements as set forth in the objects that follow.

Thus, one object of the present invention is to provide an improved flexible coupling that is light in weight and will still enable relative axial, rotary, and angular misalignment between opposing tubular members or between a tubular member and another structure having a communicating fluid passage therein.

Another object of the present invention is to provide an improved flexible coupling of light weight which conforms with the aforegoing object and which will also maintain a proper range of compression of the sealing member embodied therein during such axial, rotary, or angular misalignment, regardless of the location of the sealing member within its cavity.

A further object of the present invention is to provide an improved flexible coupling of light weight which maintains proper sealing pressure regardless of relative axial, rotary, or angular misalignment between the members being connected, and which will also maintain a fluid tight seal under a varying range of pressure and temperature conditions.

More particularly, it is an object of the present invention to provide a light weight improved flexible coupling which embodies a structure which will maintain proper sealing forces even under low pressure fluid flow conditions.

Still a further object of the present invention is to provide a method of forming the end of a tubular member such that it is adaptable to and forms a part of the coupling according to the present invention.

These and other objects and advantages of the present invention are generally achieved by providing an improved flexible coupling including a cylindrical sleeve member designed to encircle a tubular end portion. The tubular end portion is provided with a beaded section which is sealed over an inner liner.

The sleeve is coupled to the beaded portion of the tubular end portion, preferably by a lock ring and sealed thereto through an O-ring which is retained in a cavity defined by the beaded portion, the end of the tube, and a part of the liner.

An important feature of the present invention is to use the tube as such as a means of assisting in the formation of the O-ring cavity and also as a means of locking the sleeve portion of the coupling to the tube.

In accordance with the improved method of the present invention, a liner member is sealed to the tubular end portion by an expander mandrel, which is effect turns the liner inside out through cooperation with a swaging block to thereby seal the tubular end portion to the liner and at the same time form a beaded portion on the tubular end portion which in conjunction with the liner forms an O-ring cavity.

A better understanding of the improved method of forming and structure for the improved coupling of the present invention will be had by reference to the drawings, showing merely illustrative embodiments thereof, and in which.

Figure 1:
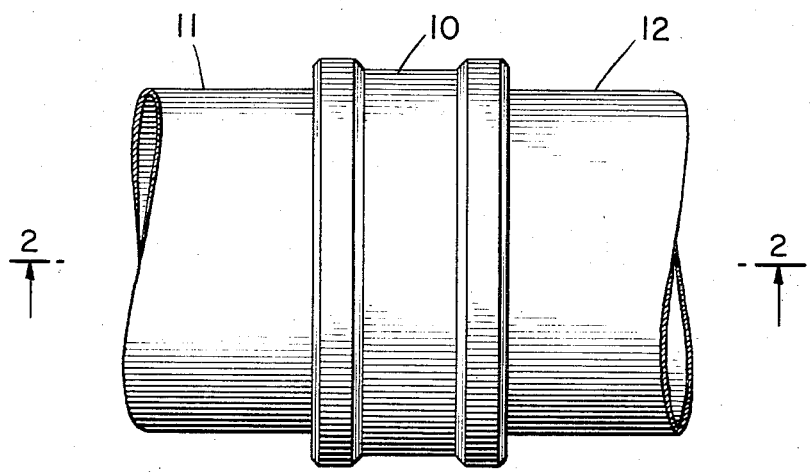
FIGURE 1 is an external view of a coupling of the present invention applied to connect two opposing tubular members.

Referring now to the drawings, there is shown in FIGURE 1 a coupling according to the present invention including an outer sleeve member 10 connecting opposing tubular end portions 11 and 12. It will be understood, however, that although the coupling will be described from the standpoint of its application to two opposing tubular end portions, that the coupling is also adaptable to connecting one tubular end member to any type of structure having a fluid passage and thus that, in effect, only one half portion of the coupling need be used in certain requirements.

Figure 2:
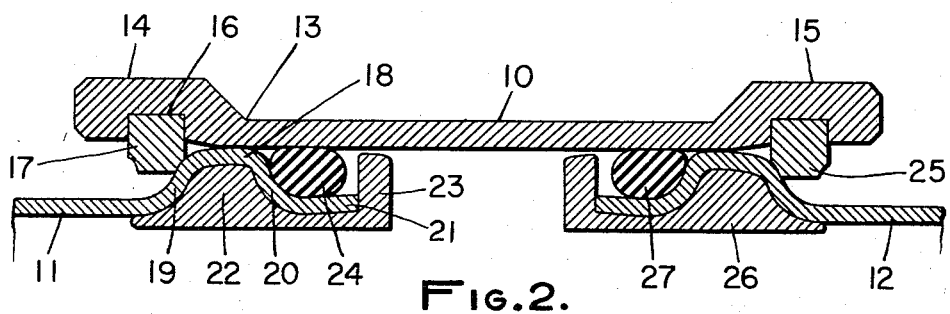
FIGURE 2 is a view taken in the direction of the arrows 2—2 of FIGURE 1 showing the internal construction of the coupling.

As more clearly seen in the view of FIGURE 2, the sleeve 10 is angled outwardly at 13 to form an increased diameter annular portion 14. A similar annular portion 15 is formed at the opposite end of the sleeve 10.

Since the left half and right half portions of the improved coupling of the present invention are identical, except reversed in position, a description of the left half will suffice for both. The increased diameter annular portion 14 has formed therein an annular recess 16 designed to receive a lock ring 17. The lock ring 17 is designed to engage a beaded section 18 of the tubular end portion 11. More specifically, in the preferred embodiment shown, the lock ring 17 engages an outer sloping sidewall 19 of the beaded section 18 such that the tubular member 11 is prevented from axially moving outwardly beyond the lock ring 17, although it may move inwardly towards the opposing tubular end portion 12 in the area shown in FIGURE 1.

The bead 18 has an inner sidewall 20 which slopes down into a substantially axially extending end portion 21 of the tube 11, to in part define an O-ring cavity. The beaded portion 18 and the portion 21 of the tubular end portion 11 are sealed to a liner 22 which has an inner end in the form of a radially extending lip 23. The lip 23 completes the generally U-shaped O-ring cavity which has mounted therein an O-ring 24.

A feature of the present invention is to use the tubular end portion 11 as a means of forming a part of the coupling. Thus, it is seen that the beaded portion 18 not only defines a part of the O-ring cavity, but also forms the structure whereby the lock ring 17 retains the sleeve member over the O-ring 24, the latter forming the sealing structure.

Figure 3:
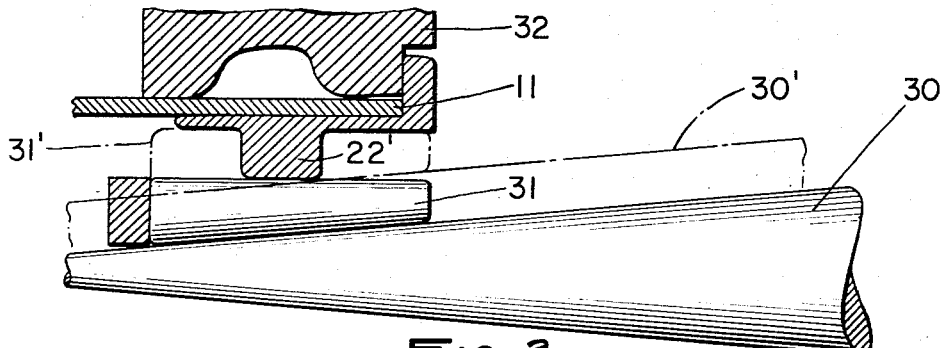
FIGURE 3 is a view, partially schematic, showing the manner in which the liner is forced against the tubular end portion to form the beaded section and seal the liner thereto as well as the means by which the O-ring cavity is formed; and, FIGURE 4 is a view of another embodiment of a coupling construction according to the present invention.

Although there may be various ways of forming the tubular end portion 11 into sealed relationship with the inner liner 22, a preferred method is schematically indicated in FIGURE 3.

Thus, there is shown in FIGURE 3, a mandrel 30 having mounted thereon a roller 31 designed to engage a liner 22' to form it into the shape of the liner 22 shown in FIGURE 2. Thus, the tubular end portion 11 is placed against a swaging block 32 appropriately contoured and the liner 22' is placed thereover. Thereafter, the expander mandrel 30 and associated roller 31 are forced inwardly as indicated by the dotted line showing 30' and 31', respectively, to thus force the enlarged portion of the liner 22' up into the cavity of the swage block 32 and thereby urge the tubular end portion 11 also into the swage block so that the beaded structure 18 and the liner configuration 22 (as seen in FIGURE 2) are formed. Preferably, for this purpose, light weight aluminum is employed for all metal parts used in the coupling construction.

Figure 4:
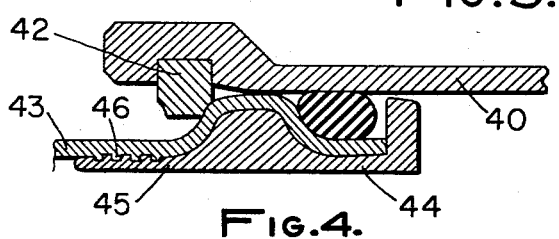

In a modified construction, the coupling may be formed as in FIGURE 4. Thus, in FIGURE 4, there is shown a partial portion of a sleeve 40 having an annular increased diameter end portion 41 designed to receive a lock ring 42.

A tubular end portion 43 is shown encircling a liner 44. Instead of the liner 44 extending only in one direction, as with the liner 22, the liner 44 is provided with a locking skirt portion 45 having grooves and lands 46 that are forced into mating engagement with the tube end portion 43. Thus greater strength is achieved.

Also, this type of construction will yield a much stronger connection, thereby making it more adaptable to large diameter tubes or for any tube where unusual amounts of pressure and of flexure are involved.

From the foregoing, it will be seen that the present invention yields an unusually rugged and still light weight improved flexible coupling construction, which embodies a relatively few number of parts, and which will provide a satisfactory sealing force throughout a wide range of pressure and temperature conditions. In this regard, it should be noted that the O-ring cavity may be shaped with respect to and including the liner 22 in such a manner as to provide the advantages attained in the previously mentioned co-pending patent application, of which the present application form a continuation-in-part.

It will be appreciated, however, that various changes and modifications may be made to the improved flexible coupling of the present invention and the method of forming same without departing from the spirit and scope of the invention as set forth in the following claims.

What is claimed is:
1. In a flexible coupling, the combination comprising: a tubular end portion, said tubular end portion including a radially outwardly deformed portion spaced from the end thereof; liner means sealed radially within and about the entire inner periphery of said deformed portion, said liner means defining with said tubular end portion an annular U-shaped cavity, and wherein said liner means includes a radially outwardly extending lip to define one upstanding wall of said cavity and wherein said outwardly deformed portion defines in part the opposing wall of said cavity; a generally cylindrical sleeve member encircling said cavity; sealing means retained in said cavity and sealingly engaging said sleeve and said tubular end portion; and, locking means securing said sleeve member to said tubular end portion.

2. In a flexible coupling, the combination comprising: a tubular end portion, said tubular end portion including a beaded portion spaced from the end of said tubular end portion; inner liner means sealed to said tubular end portion and defining therewith an annular U-shaped cavity, and in which said liner means includes a radially outwardly extending lip adjacent the end of said tubular end portion forming one upstanding wall of said cavity and in which a part of said beaded portion defines in part the opposing upstanding wall of said cavity; a cylindrical sleeve member encircling said cavity; an O-ring retained in said cavity and co-functioning with said sleeve member, said beaded portion, and said liner means; said liner further having an annular radially outwardly extending enlargement fitting into and conforming to the inner walls of said beaded portion, and the axial length of said U-shaped cavity being greater than the cross-sectional diameter of said O-ring; and, means locking said sleeve member to said tubular end portion.

3. In a flexible coupling, the combination comprising: a tubular end portion, said tubular end portion including a beaded portion spaced from the end of said tubular end portion; inner liner means sealed radially within and about the entire inner periphery of said beaded portion, said inner liner means including a radially outwardly extending lip adjacent the end of said tubular end portion, said lip defining with said beaded portion the opposing walls of a U-shaped cavity for receiving sealing means; a generally cylindrical sleeve encircling said tubular end portion over said cavity and said beaded portion; sealing means retained in said tubular end portion interposed said beaded portion and said lip, said sealing means being designed to co-function with said sleeve, said beaded portion, and said lip to provide an effective seal under flexing of said coupling; and means locking said sleeve to said tubular end portion.

4. The combination, according to claim 3, in which said cylindrical sleeve member is provided with a locking ring designed to engage the outer portion of said beaded portion to limit the inner axial movement of said sleeve relative to said tubular end portion.

5. The combination, according to claim 4, in which said cylindrical sleeve member is provided with an increased diameter portion, said increased diameter portion having an annular recess to accommodate said locking ring.

References Cited
UNITED STATES PATENTS

| | | | |
|---|---|---|---|
| 1,923,775 | 8/1933 | Crowley | 285—347 |
| 2,150,361 | 3/1939 | Chobert | 29—523 X |
| 3,186,739 | 6/1965 | Mahoff et al. | 285—369 X |

FOREIGN PATENTS

| | | |
|---|---|---|
| 150,205 | 7/1937 | Austria. |
| 745,843 | 2/1933 | France. |
| 866,626 | 4/1961 | Great Britain. |
| 910,578 | 11/1962 | Great Britain. |

CARL W. TOMLIN, *Primary Examiner.*

THOMAS F. CALLAGHAN, *Examiner.*